Dec. 14, 1965          C. L. CLEMENT          3,223,990

DECIMAL ACCUMULATOR AND/OR SELF-DECODING DIGITAL DISPLAY UNIT

Filed March 22, 1962          2 Sheets-Sheet 1

INVENTOR.
CARL L. CLEMENT
BY Elliott & Pastoriza
ATTORNEYS

Dec. 14, 1965
C. L. CLEMENT
3,223,990
DECIMAL ACCUMULATOR AND/OR SELF-DECODING DIGITAL DISPLAY UNIT
Filed March 22, 1962
2 Sheets-Sheet 2
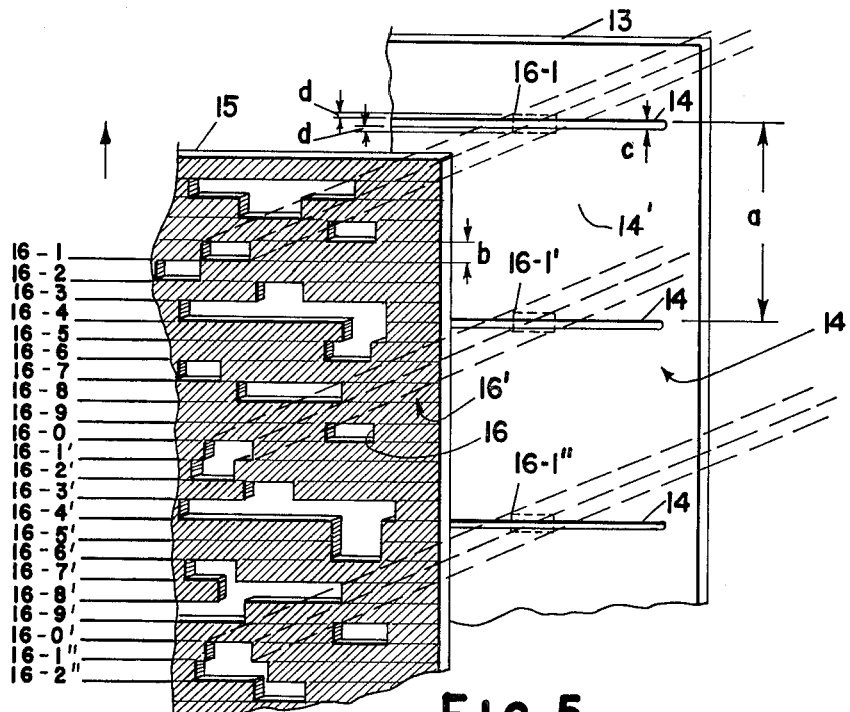
FIG. 5.
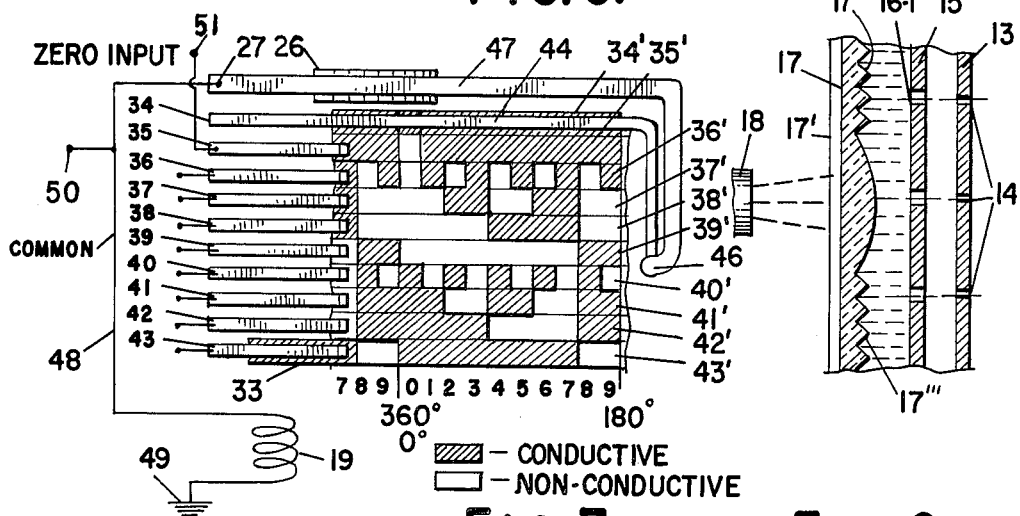
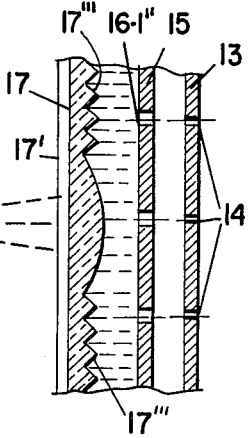
FIG. 7  FIG. 6.
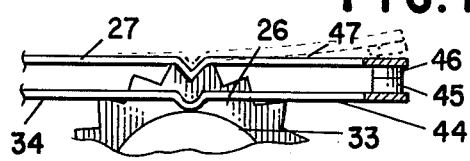
FIG. 8.
INVENTOR.
CARL L. CLEMENT
BY Elliott & Pastoriza
ATTORNEYS

United States Patent Office 3,223,990
Patented Dec. 14, 1965

3,223,990
DECIMAL ACCUMULATOR AND/OR SELF-DECODING DIGITAL DISPLAY UNIT
Carl L. Clement, Santa Monica, Calif., assignor to Kauke and Company, Inc., a corporation of California
Filed Mar. 22, 1962, Ser. No. 181,683
9 Claims. (Cl. 340—324)

This invention relates to a digital display unit or "read-out" for displaying a symbol or number pre-selected from a group of symbols or numbers. This application is a continuation-in-part of my co-pending patent application Serial No. 86,394, filed February 1, 1961, and entitled "Decimal Accumulator and/or Self-Decoding Digital Display Unit," now abandoned.

One object of this invention is to provide a device which will display in a clear manner a numeral indicating a count of a number of electrical pulses received by the unit, thereby providing a simple counter.

Another important object is to provide a display unit including a self-decoding means for displaying a numeral corresponding to a particular coded signal so that automatic conversions between different number systems, such as between binary and decimal, may be achieved.

Another object is to provide a numerical display unit in which any particular numeral is displayed by mechanical means so that in the event of an electrical power failure, the particular selected numeral is still determinable.

Still another important object is to provide a unit capable of meeting the foregoing objects which is long-lived reliable in operation, and relatively inexpensive to manufacture.

Briefly, these and many other objects and advantages of this invention are attained by providing a shutter plate having a plurality of transparent and opaque regions and a master plate having a plurality of indicating regions, portions only of which are visible through the shutter plate. These visible portions may be positioned to define a numeral, relative shifting of the master and shutter plates blocking the portions and rendering other portions of the indicating regions visible through the shutter plate to thereby define a different numeral. The means for effecting a relative shifting between the shutter and master plates operates through a plurality of discrete positions so that a plurality of different numerals or other symbols become visible through the transparent regions on the shutter plate.

In the preferred embodiment of the invention, the relative shifting between the plates is accomplished by a ratchet operated spiral cam engaging a cam follower secured to the master plate. Rotation of the cam through discrete angular positions will then shift the master plate through its discrete positions. Movement of the cam may be effected by a stepper motor or simple solenoid operated ratchet wheel so that successive digits are displayed in response to electrical pulses to provide a counter.

A self-decoding unit may be provided by employing a drum including a pattern of conducting and non-conducting portions for completing a circuit to the stepper motor or solenoid from a plurality of wiper arms engaging the pattern on the drum. The display unit will operate until the drum is rotated to a position in which non-conducting portions are disposed beneath various ones of the wiper arms carrying current so that the circuit is broken. By this arrangement, there can be associated with a given input code a unique output digit constituting a decimal numerical equivalent to the code.

A better understanding of the invention will be had by referring to the preferred embodiment as illustrated in the accompany drawings, in which:

FIGURE 5 is a greatly enlarged fragmentary exploded view of a portion of the unit illustrated in FIGURE 2;

FIGURE 6 is an enlarged fragmentary cross section of another portion of the unit;

FIGURE 7 is a schematic plan view of one type of self-decoding structure employed with the unit of FIGURE 2; and, FIGURE 8 is a fragmentary cross section useful in explaining one of the operations performed by the unit.

Figure 1:
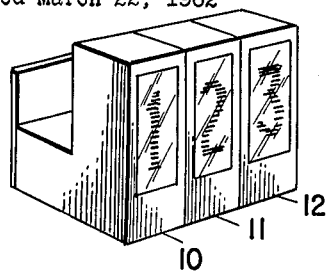
FIGURE 1 is a perspective view of three of the display units of this invention positioned in side-by-side relationship.

Referring first to FIGURE 1, there are shown three identical display units 10, 11, and 12 in side-by-side relationship, each being constructed in accordance with the present invention. These units are capable of displaying individual digits so that by placing three or more such units together, numerals up to or greater than 1000 may be represented.

Figure 2:
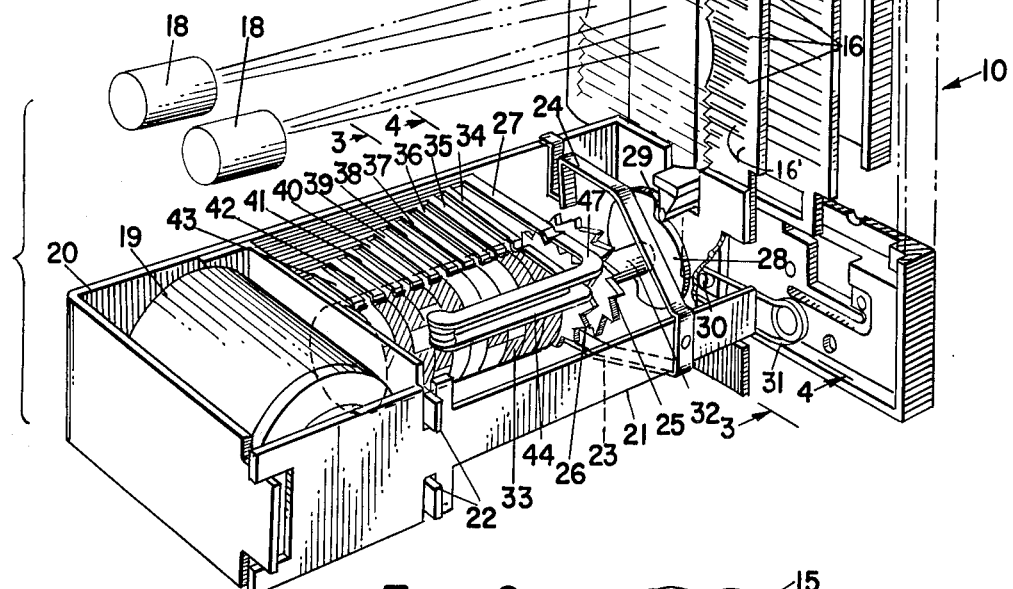
FIGURE 2 is a schematic rear perspective view partly broken away and partly exploded of one of the display units illustrated in FIGURE 1.

Referring now to FIGURE 2, there is shown in exploded perspective view the various components making up the unit 10 of FIGURE 1, the other units 11 and 12 being identical in construction. The display of a numeral or symbol is achieved by means of a shutter plate 13 provided with a plurality of horizontal transparent regions or paths 14 and a plurality of opaque regions 14' therebetween. This plate cooperates with a master plate 15 provided with indicating regions or transparent segments 16 which, in the particular embodiment set forth for illustrative purposes, constitute openings extending horizontally only given distances to define line segments, the remaining portion of the horizontal lines being opaque as at 16'.

The arrangement is such that certain portions of the opening segments on the master plate 15 are positioned to register with the transparent regions 14 on the shutter plate 13 when the plates are in face-to-face relationship and when the master plate 15 is viewed through the front of the shutter plate. These portions are positioned to define a first given symbol or numeral. Shifting of the plate in its plane relative to the shutter plate 13 will then cause other portions of the opening segments on the plate to be visible through the transparent regions of the shutter plate so that a different symbol or numeral will be defined. Visibility is increased by a collimating lens 17 and light source means 18 positioned to shine through the plates as shown. The manner in which the displayed numeral is altered as a consequence of relative shifting between the plates 13 and 15 will be explained in detail subsequently.

Figure 3:
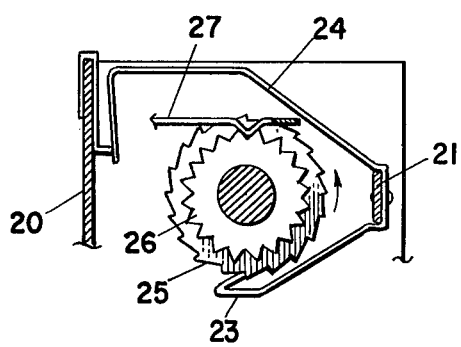
FIGURE 3 is a cross section taken in the direction of the arrows 3—3 of FIGURE 2.

In order to shift the master plate 15 through a plurality of discrete positions with respect to the shutter plate 13, there is provided a driving means in the form of a solenoid coil 19 secured to a frame structure 20. An armature 21 is pivoted at 22 to part of the frame structure as shown. Secured to the far end of the armature 21 is a pawl 23 including an extending spring portion 24 tied to the frame structure 20 as best seen in FIGURE 3. The tension in the spring is such as to bias the pawl 23 inwardly as viewed in FIGURE 2 or to the left as viewed in FIGURE 3 so that energization of the solenoid coil 19 to pull the near end of the armature 21 will result in the far end of the armature secured to the pawl structure swinging outwardly as a consequence of rotation about the pivot points 22, thus moving the pawl against its spring bias.

The pawl 23 is positioned to engage and rotate a ratchet wheel 25 each time the solenoid coil 19 is energized. Proper indexing of this movement is provided by an indexing wheel 26 rotatable with the ratchet wheel 25 and having indexing projections for cooperation with an indexing arm 27 secured to the frame structure 20 and biased downwardly to engage the teeth on the wheel 26.

Figure 4:
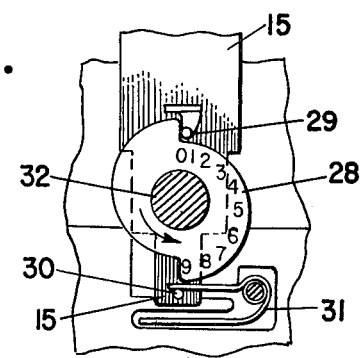
FIGURE 4 is another cross section taken in the direction of the arrow 4—4 of FIGURE 2.

A cam means 28 in the form of a spiral cam member is mounted for rotation with the ratchet wheel 25 and has its peripheral spiral surface in engagement with a cam follower 29 secured to the master plate 15 as shown clearly in FIGURE 4. Normally, the cam follower 29 is biased downwardly into engagement with the spiral surface of the spiral cam member 28 by a small projection 30 secured to the lower end of the master plate and urged downwardly by a hair pin spring 31. The cam member, ratchet wheel, and indexing wheel are all axially mounted on a single shaft 32.

With the foregoing arrangement, it will be evident that rotation of the cam member 28 by rotation of the shaft 32 will result in the master plate 15 being shifted upwardly relative to the shutter plate 13. Because of the ratchet arrangement, the cam is moved through discrete angular distances resulting in discrete upward steps or positions of the master plate 15 with respect to the shutter plate 13.

In the particular example chosen for illustrative purposes, the shutter and master plates are designed to display the numerical digits 1, 2, 3, 4, 5, 6, 7, 8, 9, and 0. Therefore, it is necessary that the plate 15 be capable of shifting through ten discrete vertical positions to display the ten symbols respectively. The ratchet and indexing wheels each have twenty teeth so that ten steps result in rotation though 180 degrees. In FIGURE 4, the cam member 28 has ten angular positions numbered thereon over 180 degrees in accordance with the digits displayed. It will be evident that after the cam member 28 has been stepped through ten positions, it will have rotated through 180 degrees, and the cam follower 29 will drop down to the position zero preparatory to repeating a sequential display of the digits.

The shaft 32 carries a drum 33 for rotation with the cam member. Drum 33 includes a pattern of conductive and non-conductive portions on its surface. A plurality of wiper arms 34, 35, 36, 37, 38, 39, 40, 41, 42, and 43 are positioned to engage the pattern on the drum as shown. These wiper arms and drum are useful in providing a self-decoding circuit for operating the solenoid 19 and will be described in detail subsequently.

Referring now to the enlarged fragmentary view of FIGURE 5, the manner in which the ten individual numerals are displayed through the shutter plate 13 with respect to the ten discrete positions of the master plate 15 will now be explained in detail. As shown, the transparent regions or paths 14 on the shutter plate 13 are vertically separated by a distance $a$, which distance may be of the order of .06 inch. In the preferred embodiment, there are twenty-one such horizontal transparent paths 14, thereby providing a display of a numeral approximately $21 \times .06$ or 1.26 inches in height.

The master plate 15 in turn includes indicating regions in the form of transparent or cutout portions which extend various different horizontal distances to define essentially horizontal paths including transparent and opaque segments. There are provided ten different horizontal paths one above the other between adjacent transparent portions 14 on the shutter plate or within the vertical distance $a$. Thus, the first ten paths are disposed at the level of the horizontal lines numbered 16–1 through 16–0 as shown to the left of the plate of FIGURE 5. As indicated by the dotted lines, the particular opening 16–1 is in a position to register with the first horizontal transparent path 14 of the shutter plate 13. The next opening 16–1' spaced ten lines below the 16–1 opening is arranged to register with the next horizontal transparent path 14 of the shutter plate 13. Similarly, the next opening 16–1" is arranged to register with the next horizontal path 14.

All of the openings between the 16–1, 16–1', 16–1" openings as described are blocked by the opaque portion 14' on the shutter plate 13. Thus, when viewed through the shutter plate, only the overlapping or registering transparent portions of the plates 13 and 15 will be visible, and in the particular illustration of FIGURE 1, the numeral 1 will be displayed being made up of short horizontal line segments extending from the top to the bottom of the display unit.

Since there are ten opening segments within the dimension $a$, the width $b$ of each segment is $.06 \div 10 = .006$ inch. The width $c$ of the paths 14 in turn is .003 inch. There is thus provided some overlap in the registering portions as indicated by the letters $d$, this overlap amounting to .0015 inch on either side of the transparent path 14 as shown at the top of FIGURE 5. This overlap will result in the same numeral being displayed, notwithstanding some parallax effect as the result of shifting of the viewer's eyes above or below the lines.

If now a next numeral is to be displayed, the master plate 15 is shifted to a new discrete position, the distance of this movement corresponding to the distance $b$ or .006 inch. This shift will bring the indicating regions or openings at the levels 16–2, 16–2', 16–2", etc., into registration with the paths 14. The former openings at the levels 16–1 will be blocked by the opaque areas 14' of the shutter plate 13. A new digit such as "2" is then visible.

From the foregoing description, it will be clearly evident that shifting of the master plate 15 through ten discrete positions within the distance $a$ will result in the ten successive displays of the digits 1–0.

To render the displayed numerals visible at a distance, the light and lens 17 shown in FIGURE 2 are used. In its preferred form, the lens includes semi-cylindrical portions arranged vertically as indicated at 17' and 17" in FIGURE 2. The other side of the lens 17, as illustrated in FIGURE 6, includes saw tooth portions 17''' which will tend to collimate the light from the light sources 18 so that the light will pass directly through the various openings 16 on the master plate 15 and the corresponding transparent regions 14 on the shutter plate 13.

In accordance with an important feature of this invention, the shifting of the plate 15 can be successively effected in response to electrical pulses to provide a counter. Means are also provided for automatically returning the counter to zero. In addition, any desired numeral corresponding to a particular code provided on an input circuit to control the driving means may be displayed. These operations will be understood by referring to the layout of the drum 33 in FIGURE 7 and the fragmentary view in FIGURE 8.

The various circumferential paths engaged by the wiper arms 34–43 are designated respectively in FIGURE 7 by the same numerals followed by a prime, 34'–43'. As shown by the cross-hatching, the path 34' is a completely conductive path over 360 degrees and constitutes a common circuit engaging wiper arm 34 which includes extending portion 44. This circuit passes through 44, switch contacts 45, 46 (FIGURE 8) extending arm 47 forming part of indexing arm 27, and a lead 48 to the solenoid 19. The other side of the solenoid 19 is grounded at 49 as shown.

A counter input terminal 50 is connected to common line 48 to the solenoid. When a series or train of pulses is applied to the input terminal 50, the solenoid 19 is successively energized by each of the pulses to operate the pawl and ratchet mechanism and thus step the cam through its successive discrete positions. With this arrangement, the display unit functions simply as a decimal accumulator or counter, the particular numeral displayed when the pulses cease constituting an indication of the total number of pulses received.

In order to quickly zero the counter, there is provided a zero input terminal 51 connected to the wiper arm 35. The conductive portion 35' on the drum engaged by this arm is completely conductive over 360 degrees except for one non-conducting portion corresponding to the zero position of the drum. The conducting portion is in contact with common path 34' so that wiper arm 35 connects through path 35', path 34', arm extension 44, contacts 45, 46, index arm extension 47, index arm 27, and lead 48 to solenoid 49 for all positions of the drum except that one in which the non-conducting portion on path 35' is engaged by wiper arm 35. In this position of the drum, the digit zero is displayed.

In the operation of the zero input circuit, if energy is applied to the zero input terminal 51, it will pass through the arm 35, paths 35', 34', contacts 45, 46, and common line 48, to the solenoid 19 as described, thereby energizing the same. With the solenoid coil 19 energized, the pawl operating in the ratchet wheel will rotate the indexing wheel 26, thereby lifting the indexing arm 27 and breaking the contacts 45 and 46 as will be clear by the dotted lines shown in FIGURE 8. The solenoid coil 19 will then be de-energized and the spring pawl will return to its normal position preparatory to engaging the next ratchet tooth. But by this time the indexing arm 27 will have indexed into the indexing wheel causing the contacts 45 and 46 to make contact again and thus again energize the solenoid 19.

The system will thus continue to step through its cycle until the non-conducting portion on the path 35' falls under the wiper arm 35, at which time the circuit to the solenoid 19 is broken. The drum will stop rotating in this position corresponding to the zero position, which position is that of the cam as shown in FIGURE 4 so that the master plate will display the zero digit.

To provide a self-decoding unit in accordance with the invention, the remaining wiper arms 36–43 may be used. For example, assume it is desired to convert a binary output into a decimal display. The remaining conducting and non-conducting paths 36'–43' on the drum surface as illustrated in FIGURE 7 cooperating with wiper arms 36–43 are used for effecting such conversion. It should be understood, of course, that any other type of decoding may be effected, depending upon the type of pattern employed.

To understand the operation of the decoding feature of this invention, consider first the binary representation of the numbers 0 through 9 together with their binary complements:

| Number | Binary | Complement |
|---|---|---|
| 0 | 0000 | 1111 |
| 1 | 0001 | 1110 |
| 2 | 0010 | 1101 |
| 3 | 0011 | 1100 |
| 4 | 0100 | 1011 |
| 5 | 0101 | 1010 |
| 6 | 0110 | 1001 |
| 7 | 0111 | 1000 |
| 8 | 1000 | 0111 |
| 9 | 1001 | 0110 |

Ordinarily, the output circuit of the computer or other apparatus providing the binary code constitutes a relay or flip-flop so that both the binary and complement are simultaneously available from the contacts of the relay or from two terminals of the flip-flop. Thus, no special output devices are required.

In the conversion of the binary to the decimal, both the binary and its complement are employed in conjunction with the wiper arms 36–43 illustrated in FIGURE 7. More particularly the wiper arms 36, 37, 38, and 39 are energized, respectively, depending upon whether the complement code for the number constitutes a one or a zero. Similarly, the wiper arms 40, 41, 42, and 43 are energized or not energized, depending upon whether the binary code is a one or zero. The conductive portions on the drum surface are all in electrical engagement with the common conducting path 34' for the common wiper arm 34. Thus, any of the wiper arms 36–43 which are energized and lie on a conductive portion of the drum pattern will pass current to the common path 34' and out the common wiper arm 34, switch contacts 45, 46, etc. to the solenoid 19.

With the foregoing arrangement, it will be evident that it is possible to arrange the pattern such that for one and only one position of the drum the various wiper arms 36–43, which engage conducting portions are not energized and the various wiper arms which engage non-conducting portions constitute the energized wiper arms. The particular position will thus not allow any of the energized wiper arms to pass current to the common wiper arm 34 since only the non-energized ones are those which are on conducting portions. If any other portion of the drum falls under the wiper arms so that one of the energized wiper arms falls on a conducting portion, the drum will be stepped by energization of the relay coil 19 until the unique position is reached. Thus, the various combinations of energizations and non-energizations of the wiper 36–43 in accordance with the complement and binary thereof may be determined such that the drum will stop at the particular position to display a decimal unit corresponding to the particular combination of energizations supplied.

As a specific example and with reference to the table set forth in FIGURE 7, for the numeral 0 the binary wiper arms 40, 41, 42, and 43 will not be energized whereas the complementary binary wiper arms 36, 37, 38, and 39 will all be energized. This state is indicated by the binary code 0000 and its complement 1111. With particular reference to FIGURE 7, it will be evident that if any conducting portion of the drum falls under any one of the energized wiper arms 36, 37, 38, or 39, current will pass from the energized wiper arm to the common path 34' and out the common wiper arm 34, contacts 45, 46 and so forth to the solenoid 19. From an inspection of FIGURE 7, it will be evident that the only position in which the four energized wiper arms are all in engagement with non-conducting portions is for the numeral 0 wherein the circuit is broken.

Assume now that the wiper arms 36–43 are energized in accordance with the complement and binary code for the numeral 6. In this event, and in accordance with the table, binary wiper arms 40 and 43 will be non-energized and binary wiper arms 41 and 42 will be energized corresponding to zero, one, one, zero, as shown in the binary code. Similarly, for the complementary wiper arms 36, 37, 38, and 39, the wiper arms 36 and 39 will be energized and the two center wiper arms will not be energized. The only position of the drum in which non-conductive portions fall under the energized wiper arms will be that corresponding to the numeral 6 wherein it will be noted that the wiper arms 41 and 42 engage non-conducting portions on paths 41' and 42' and the wiper arms 36 and 39 engage non-conducting portions on paths 36' and 39'. Thus, no energy can pass to the common path 34' and through the common line 48 to the solenoid 19 so that the drum will stop rotating at the unique position corresponding to the numeral 6. In this position, this particular numeral will be displayed through the transparent regions of the shutter plate.

In the event that the display unit is to be used as a counter and employed with other units such as illustrated in FIGURE 1, it is desirable to provide a carry-over pulse to the next unit every time the first unit changes from 9 to 0. This may readily be accomplished by simply providing an additional carry-over wiper arm arranged to wipe on a non-conductive surface which has a conducting portion connecting to the common wiper arm path 34' at a point corresponding to the numeral 0 so that each time the drum rotates from 9 to 0, this conducting portion will pass under the additional wiper arm to provide an output signal to the next counter. This output signal would be received on the corresponding input counting terminal of the next counter.

From the foregoing description, it will be evident that the present invention has provided a greatly improved display unit which may be employed either as a decimal accumulator or counter or as a self-decoding readout unit. As a consequence of the unique shutter and master plate arrangement, it will also be clear that even in the event of a power failure, at least one digit or symbol will always be displayed because of the ratchet and indexing structure which will always cause the plates 13 and 15 to assume one of their discrete positions with respect to each other. Even though a power failure may extinguish the light sources 18, it is still possible to determine the particular numeral displayed.

In connection with the above, it should be understood that the invention is not by any means limited to the provision of transparent segmental portions on the master plate 15 but could alternatively employ dark and light line segments portions of which could be visible through the transparent regions of the shutter plate 13. In this event, there is no need for any light behind the master plate 15. It should also, of course, be understood that the different indicating regions of the master plate 15 could be of different colors so that each cymbol would have a unique color.

For example, with respect to FIGURE 5, the various cutout portions corresponding to the 16–1, 16–1', 16–1'', etc., instead of being openings could all be colored red or constitute short line segments of the color red. Similarly, the indicating regions corresponding to the numeral 2 as indicated at 16–2, 16–2', 16–2'', etc., could all be colored green.

When these numerals are successively displayed through the transparent regions 14 of the shutter plate 13, it will be clear that each numeral will have its own distinct color. Thus, the mechanical arrangement for figure or symbolic display has unique advantages and unique versatility.

What is claimed is:
1. A display unit including, in combination:
   a shutter plate having a plurality of transparent regions and opaque regions;
   a master plate having a plurality of indicating regions of different lateral and vertical extent;
   means for positioning said shutter plate and master plate in face-to-face relationship so as to lie in substantially parallel planes so that portions of said indicating regions on said master plate are visible through said transparent regions on said shutter plate; and,
   means for effecting a relative successive shifting between said shutter plate and master plate in the planes of the plates through a plurality of different discrete successive positions including cam means; cam follower means secured to said master plate and engaging said cam means; and driving means for moving said cam means through discrete distances to thereby effect a movement of said cam follower means and said master plate through said discrete positions, whereby a plurality of other portions of said indicating regions on said master plate respectively become successively visible through said transparent regions on said shutter plate.

2. A unit according to claim 1, including a light source, said indicating regions constituting transparent segments on said master plate, some of which register with said transparent regions on said shutter plate, said light source being positioned to shine through only those segments and transparent regions that are in registration so that only those segments in registration are visible when viewed through said shutter plate.

3. A unit according to claim 2, in which said cam means comprises a cam member having a spiral periphery;
   a shaft rotatably mounting said member;
   a ratchet wheel secured to said shaft, said driving means comprising a pawl member biased into engagement with said ratchet wheel; and,
   a solenoid coil for actuating said pawl member in response to electrical energization of said solenoid coil.

4. A unit according to claim 3, including:
   a drum mounted on said shaft for rotation therewith, said drum having a pattern on its surface constituting conducting and non-conducting portions, one of said conducting portions being in electrical connection with all of the remaining conducting portions;
   a common wiper arm in engagement with said one of said conducting portions and connected to said solenoid coil; and,
   a plurality of additional wiper arms individually effecting contact along said drum with various ones of said conducting and non-conducting portions, whereby electrical energization of certain ones of said wiper arms will complete a circuit through said common wiper arm to said solenoid coil to rotate said cam member and drum member until the pattern of conducting and non-conducting portions engaged by said plurality of other wiper arms is such that non-conducting portions are simultaneously engaged by said certain ones of said wiper arms that are energized, whereby said circuit to said common wiper arm is broken and said cam member stops rotating so that said master plate assumes one of said discrete positions with respect to said shutter plate.

5. A unit according to claim 4, in which those transparent segments that are visible through said transparent regions on said shutter plate define a different numerical digit for each of said discrete positions, said pattern on said drum being arranged such that energization of various ones of said additional plurality of wiper arms in accordance with a particular code results in the display through said shutter plate of that numerical digit in the decimal system equivalent to said particular code.

6. A unit according to claim 5, in which said pattern includes a conductive portion having one non-conducting portion at a given position; and a zero-set wiper arm positioned to engage said conducting portion whereby energization of said zero-set wiper arm will rotate said drum until said non-conducting portion is engaged by said zero-set wiper arm, at which point said drum will stop rotating in a given position corresponding to the display of the digit zero.

7. A unit according to claim 6, in which said common wiper arm includes terminal means adapted to receive a train of pulses, each pulse energizing said solenoid coil to advance said master plate through one discrete position so that the particular numeral displayed through said shutter constitutes a count of the number of pulses received, whereby a counter is provided.

8. A display unit including, in combination: numeral display means; a drum coupled to said numeral display means, said numeral display means being responsive to rotation of said drum to effect display of given numerals when said drum assumes given rotative positions; actuating means coupled to rotate said drum in response to electrical energization, said drum having a pattern on its surface constituting conducting and non-conducting portions, one of said conducting portions being in electrical connection with all of the remaining conducting portions; a common wiper arm in engagement with one of said conducting portions and connecting to said actuating means; and a plurality of additional wiper arms individually effecting contact along said drum with various ones of said conducting and non-conducting portions, whereby electrical energization of certain ones of said wiper arms will complete a circuit through said common wiper arm to said actuating means to rotate said drum until the pattern of conducting and non-conducting portions engaged by said plurality of other wiper arms is such that non-conducting portions are simultaneously engaged by said certain ones of said wiper arms that are energized, whereby said circuit to said common wiper arm is broken and said drum stops rotating so that said display unit displays a unique numeral corresponding to the rotative position in which said drum is stopped.

9. A display unit according to claim 8, in which said pattern on said drum is arranged such that energization of various ones of said additional plurality of wiper arms in accordance with a particular code results in the display by said display means of that numeral in the decimal system equivalent to said particular code.

References Cited by the Examiner
UNITED STATES PATENTS

| | | | |
|---|---|---|---|
| 2,751,584 | 6/1956 | Isborn | 340—380 |
| 2,981,941 | 8/1961 | Ogle | 340—378 |
| 3,041,600 | 6/1962 | Gumpertz | 340—378 |
| 3,042,912 | 7/1962 | Gilbert | 340—324 X |
| 3,089,131 | 5/1963 | Morgan | 340—325 |

NEIL C. READ, *Primary Examiner.*

W. C. GLEICHMAN, I. J. LEVIN, *Assistant Examiners.*